US008699320B2

(12) United States Patent
Jain (10) Patent No.: US 8,699,320 B2
(45) Date of Patent: Apr. 15, 2014

(54) MULTI-INTERFACE PORT MANAGEMENT (75) Inventor: Prakash C. Jain, Canoga Park, CA (US)

(73) Assignee: Alcatel Lucent, Paris (FR)

( * ) Notice: Subject to any disclaimer, the term of this patent is extended or adjusted under 35 U.S.C. 154(b) by 2639 days.

(21) Appl. No.: 11/018,528

(22) Filed: Dec. 17, 2004

(65) Prior Publication Data

US 2006/0092827 A1     May 4, 2006

Related U.S. Application Data (60) Provisional application No. 60/624,419, filed on Nov. 1, 2004.

(51) Int. Cl.
*H04L 12/26*     (2006.01)
*H04L 12/24*     (2006.01)

(52) U.S. Cl.
CPC ................................ *H04L 41/0654* (2013.01)
USPC ........................................................ 370/216

(58) Field of Classification Search
CPC .................................................. H04L 41/0654
USPC ......................... 370/216–228, 464–467, 474; 709/220–222, 239, 242

See application file for complete search history.

(56) References Cited

U.S. PATENT DOCUMENTS

| 4,972,470 | A | * | 11/1990 | Farago | 713/192 |
| 5,457,784 | A | * | 10/1995 | Wells et al. | 710/9 |
| 5,497,373 | A | * | 3/1996 | Hulen et al. | 370/259 |
| 5,671,355 | A | * | 9/1997 | Collins | 709/250 |
| 5,732,261 | A | * | 3/1998 | Savitzky et al. | 707/103 R |
| 6,801,506 | B1 | * | 10/2004 | Dey | 370/256 |
| 6,899,278 | B2 | * | 5/2005 | Chen et al. | 235/492 |
| 7,088,714 | B2 | * | 8/2006 | Athreya et al. | 370/389 |
| 7,136,379 | B2 | * | 11/2006 | Woods et al. | 370/360 |
| 7,170,892 | B2 | * | 1/2007 | Major et al. | 370/392 |
| 7,376,386 | B2 | * | 5/2008 | Phillips et al. | 455/3.01 |

* cited by examiner

*Primary Examiner* — Dmitry H Levitan
(74) *Attorney, Agent, or Firm* — Wall & Tong, LLP (57) ABSTRACT

The present embodiments of the invention provide systems and methods for managing forwarding devices that support hybrid multi-interface ports. This type of device supports a plurality of physical ports, with each port supporting a plurality of interface media. The interface media supported in each port may be of varying media types, such as one may be copper and the other fiber. The systems and methods also handle failover conditions, thus ensuring network redundancy and reliability.

20 Claims, 12 Drawing Sheets

MULTI-INTERFACE PORT MANAGEMENT

CROSS-REFERENCE TO RELATED APPLICATIONS

This application claims the benefit of U.S. Provisional Patent Application Ser. No. 60/624,419 filed Nov. 1, 2004, entitled "Multi-Interface Port Management," which is hereby incorporated by reference herein for all purposes.

FIELD OF THE INVENTION

The present invention relates to multi-interface hybrid ports of a forwarding device and more particularly to hybrid ports with a plurality of interface media and method of managing same.

BACKGROUND

Ethernet switches currently manage only one type of physical interface or interface media/media interface within a port. As a result, configuration, control and usage of the port are exclusively limited to the particular type of physical interface or interface media presently engaged.

A way to manage a port that accepts multiple physical interface types, such as both copper and optical fiber, is currently not available. Accordingly, the application of a port with multiple physical interfaces is presently limited by the Ethernet switch management limitations. One such limitation includes the current inability to implement network redundancy for network reliability using multi-interface ports without using additional ports and equipment.

A method and device that alleviate the problems discussed above is, thus, highly desirable. The present invention solves these problems.

SUMMARY

The present embodiments of the invention provide systems and methods for managing forwarding devices that support hybrid multi-interface ports. This type of device supports one or more physical ports, with each port supporting a plurality of interface media. The two interface media implemented in each port, for example, may be any of a number of media type including wired and wireless including copper-based conductor and optical fiber, for example.

The forwarding device of the present invention also supports failover and redundancy. Meaning, unlike traditional forwarding devices that rely on a different port, for example, port 2, when the physical interface on port 1 fails, the forwarding device of the present invention uses port 1 but a different interface media within port 1.

The forwarding device of the present invention generally includes one or more physical ports with each physical port supporting a plurality of interface media and wherein only one interface media within a port may be active or operational at a time. The device further includes an information database that contains media-dependent parameters or media parameters for each of the interface media. This information database also contains port-related information, including primary interface media and the current operational interface media.

Another embodiment of the invention provides for a method that manages a hybrid-forwarding device. This forwarding device supports one or more physical ports, with each port supporting a plurality of interface media and wherein only one of the interface media within a port may be operational at a time. The method includes the steps of assigning a primary interface media for each port and assigning an operational media for each port.

BRIEF DESCRIPTION OF THE DRAWINGS

The present invention is illustrated by way of example and not limitation in the figures of the accompanying drawings, and in which.

DETAILED DESCRIPTION OF THE INVENTION

The following detailed description illustrates the invention, by way of example not by way of limitation of the principles of the invention in a fashion that clearly enables one skilled in the art to make and use the invention, and describes several embodiments, adaptations, variations, alternatives and uses of the invention, including what is presently believed to be the best mode of carrying out the invention.

To better understand the figures, like-numbered reference numerals in various figures and descriptions are used in the following description to refer to the same or similar structures, actions, operations, or process steps. In addition, reference numerals within the one hundred series, for example, 100 and 102, are initially introduced in FIG. 1, reference numerals in the two hundred series, for example, 200 and 250, are initially introduced in FIG. 2, and so on and so forth. So, reference numerals in the nine hundred series, e.g., 902 and 992, are initially introduced in FIG. 9.

Figure 1:
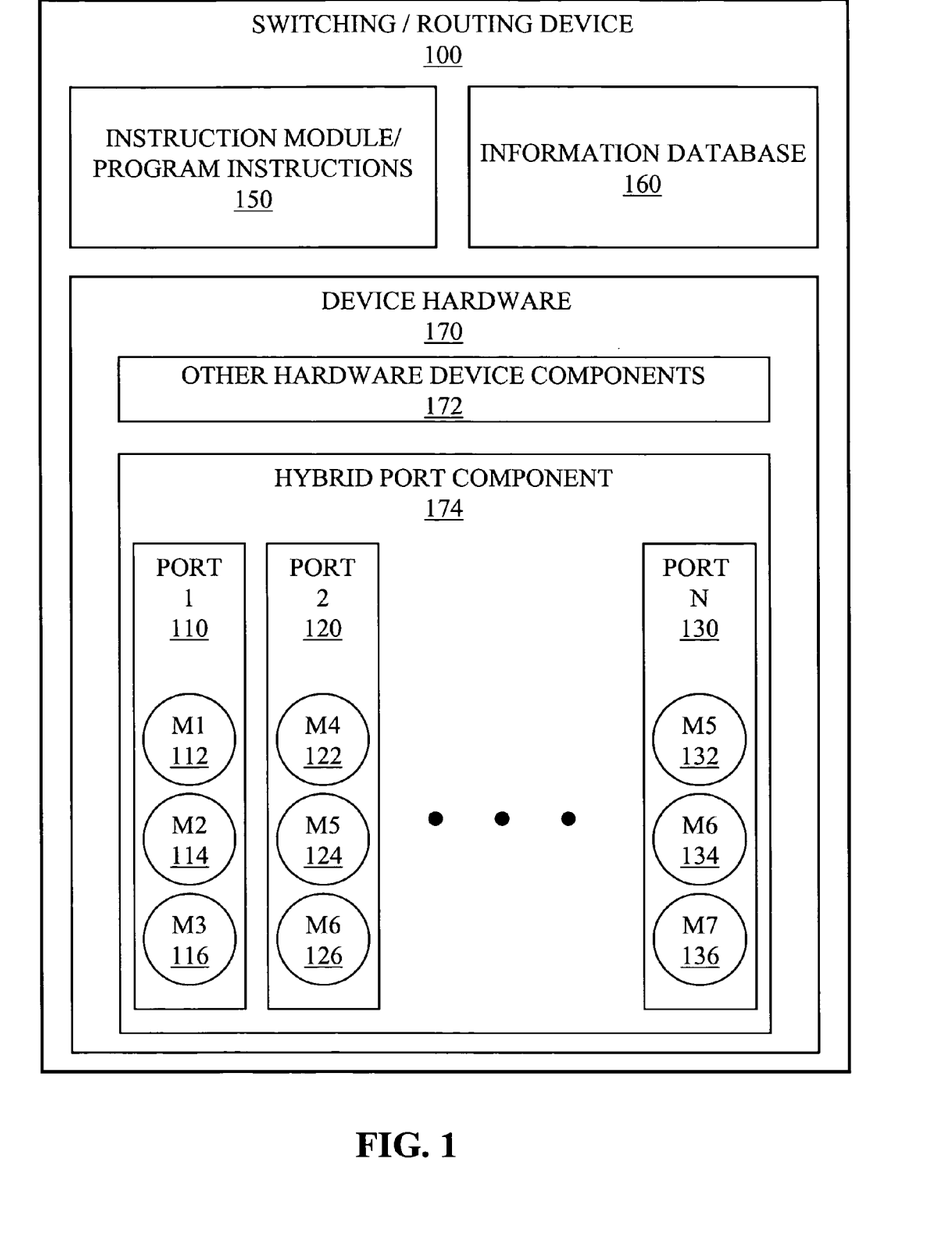
FIG. 1 is a high-level functional component block diagram of a hybrid-forwarding device in accordance with an embodiment of the present invention.

FIG. 1 is a high-level functional block diagram of a hybrid-forwarding device 100, such as a switching and/or routing device, that contains a plurality of ports 110, 120, 130. The switching and/or routing device 100, herein also referred to as a switch, preferably operates in the multiple layers of the Open Systems Interconnection (OSI) Reference Model. These switches or forwarding devices 100, thus, may operate in both the data link (layer 2) and network (layer 3) layers of the OSI model.

Unlike typical switches, the switch 100 of the present invention contains one or more hybrid port components 174 that support a plurality of physical interfaces or interface media 112, 114, 116, 122, 124, 126, 132, 134, 136 in selected ports 110, 120, 130. The plurality of physical interfaces in each port 110, 120, 130 may differ from each other, such that interface media 1 (M1 112) in port 1 is copper, while interface media 2 (M2 114) in the same port is optical fiber, for example. It is possible that interface media M3 116 is the same type as interface media M4 122. In some embodiments, one of the plurality of the physical interfaces serves as a primary interface or configured media for communicating data with the adjacent node, while the remaining physical interfaces provide redundancy for failover support, for example. In the preferred embodiment, all the ports preferably support a plurality of physical interfaces, but it is possible that one or more ports in this device 100 only support one physical interface.

The plurality of physical interfaces or interface media are selected from the group including, but are not limited to, wired media such as unshielded twisted pair (UTP), shielded twisted pair, multimode optical fiber, single-mode optical fiber, as well as other cables transmitting via photons, cables transmitting via electrons more generally and including wireless media such as radio frequency (RF) and infrared, for example. Each physical interface is associated with its own distinct set of characteristics, behaviors, status, counter values, properties, and other parameterized information. This set of data is hereby collectively referred to as media or media-dependent parameters.

These media parameters include speed (e.g., 10 Mbps and 100 Mbps), cable type (e.g., 2-pair category 3 twisted pair, 2 strands single- or multi-mode fiber), segment length (e.g., 100 m and 2000 m speed), frame size, protocol standard, link status, back-up status, and the like. These media parameters are stored in an information database that is preferably a management information database (MIB) 160.

The hybrid-forwarding device 100 of the present invention generally contains an instruction module 150, a device hardware component 170, and an information database 160. This information database 160 may also be stored as part of the memory hardware component 170 and/or incorporated as part of software component code 150.

The instruction module 150 generally functions similar to a switch or routing computer instructions or software and, thus, manages the device 100 and enables outside systems, such as network management systems, to communicate and interact with the device 100. This instruction module 150 may be a software component and preferably a module of instructions, executable by a computer processor.

The device hardware 170 component in this embodiment of the invention includes one or more hybrid port components 174, as discussed above, and other hardware device components 172 that carry out the various functions of a typical forwarding device or switch 100. The other device components 172 may include buffer, content addressable memory, queue manager, forwarding table, forwarding processor, classifier, for example.

One of ordinary skill in the art will appreciate one or more of the functions in this device 100 discussed herein may be incorporated in both software and hardware, i.e., firmware. In another embodiment, the information database 160 is incorporated in the software component 150.

Figure 2:
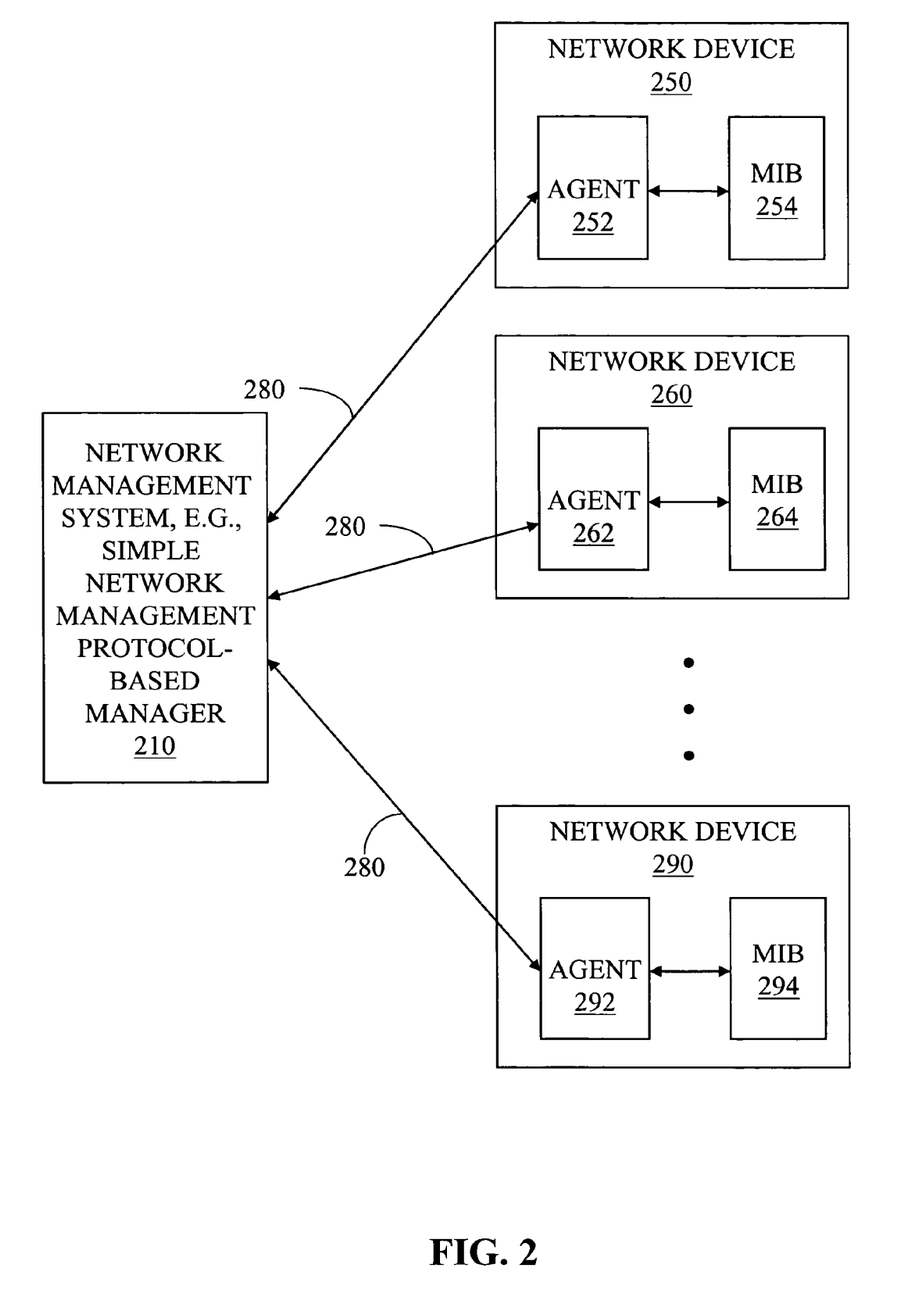
FIG. 2 is a block diagram of a simple network management protocol (SNMP)-managed network in accordance with an embodiment of the present invention.

FIG. 2 is a high-level block diagram of a network managed using Simple Network Management Protocol (SNMP) in accordance with an embodiment of the invention. SNMP is an industry standard set of protocols for managing network devices. Other network management protocols, like remote monitoring (RMON), may also be used.

The SNMP-managed network of the preferred embodiment generally includes three parts: a network management systems (NMSs) or SNMP managers 210, one or more managed devices 250, 260, 290, and one or more agents 252, 262, 292.

The NMS 210 preferably monitors and controls managed devices. The NMS may be packaged within a user interface application to facilitate network management. One or more NMSs exist in any managed network.

A managed device 250, 260, 290 is a network node that contains an agent 252, 262, 292. Managed devices collect and store management information and make this information available to the NMSs, via the SNMP agents. Managed devices can be routers and access servers, switches and bridges, hubs, computer hosts, or printers. In an embodiment of the invention, the forwarding device 100 is a managed network device 250, 260, 290.

An agent 252, 262, 292 is preferably a network-management instructions module or program, generally a software program, that resides in a managed device 250, 260, 290. An agent interfaces or communicates with the management information (MIB) 254, 264, 294, and thus is aware of management information, particularly device information. In an embodiment of the invention, the agent 252, 262, 292 is part of the instruction module 150, such as a software component, of the forwarding device 100.

Agents respond to read and write requests 280 from the SNMP managers/NMSs and also send event notifications 280, called traps, to the SNMP managers. Traps are unsolicited, asynchronous events that managed network devices generate to indicate changes. These traps notify and alert the NMSs of the occurrence of conditions, such as thresholds, that exceed predetermined values and links that are down. The managed device should be configured such that the instruction module 150, particularly, the agent 252, 262, 292 sends a trap to the NMS indicating that a particular media interface within a particular port has failed.

A MIB 254, 264, 294 is a collection of definitions, which define and describe the properties, status, and characteristics of managed objects within a managed device. It also contains the media parameters of each interface media. A managed object is any item in a managed device that can be singled out for discovery, monitoring, or user intervention and correction. In this embodiment, the port and the interface media are managed objects.

Managed objects include one or more object instances, which, in this example, are essentially variables. An object identifier (or object ID) uniquely identifies a managed object. There are generally two types of managed objects: scalar and tabular. Scalar objects define a single object instance. Tabular objects define multiple related object instances that are grouped in MIB tables.

The MIB may come from the manufacturer with predefined values, such as media parameters for each interface media available on the network device. The values in the MIB may also be modified, for example, by the network administrator using an NMS. This MIB is preferably incorporated as part of the instruction module 150.

One of the object identifiers used in SNMP-based network management applications is the interface index, IfIndex. This ifIndex is used to access an interface table. IfIndex is a unique identifying number, similar to a primary key, associated with a physical or logical interface. In this embodiment of the invention, each ifIndex relates to and identifies an individual, preferably physical, port.

Figure 3:
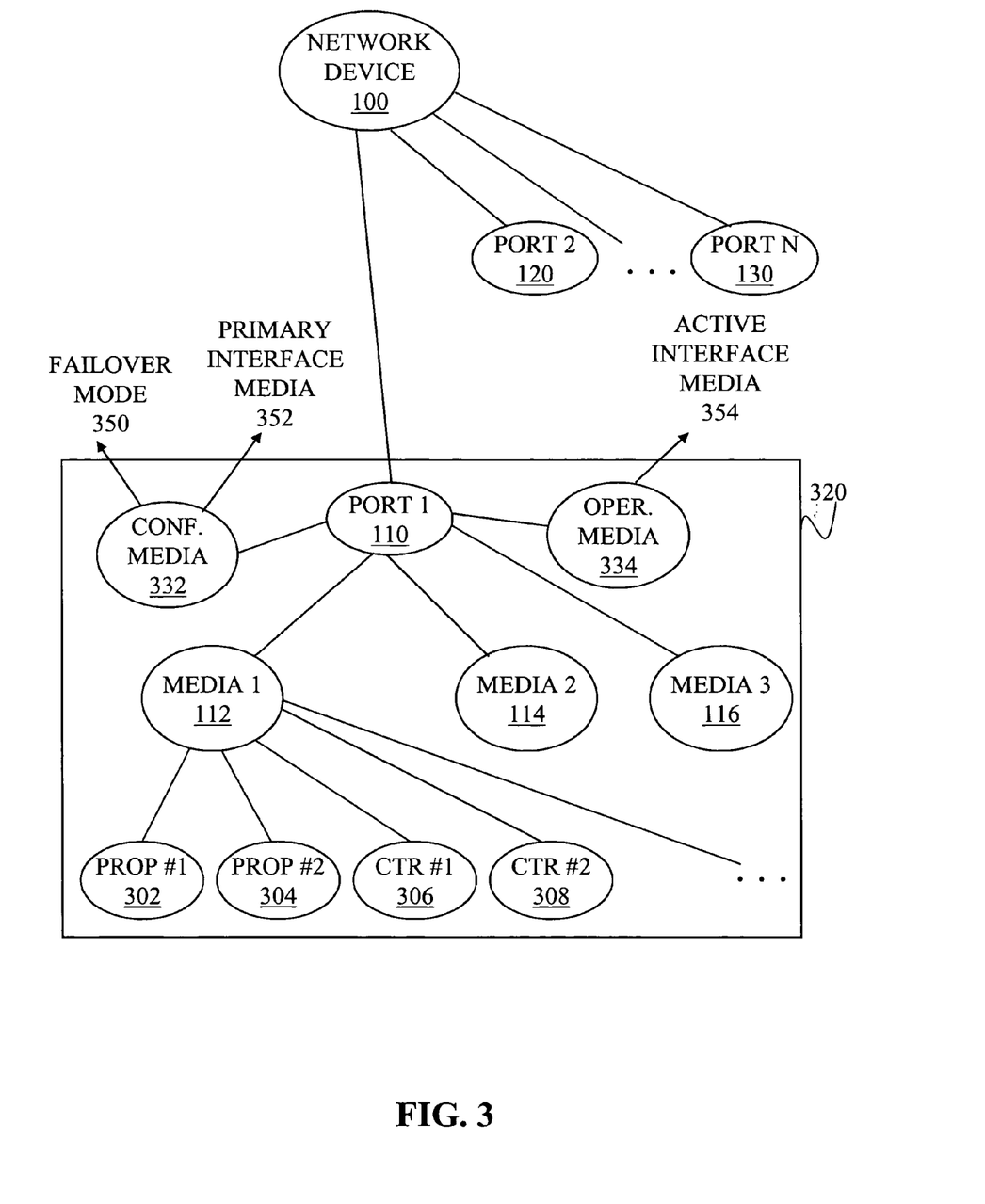
FIG. 3 is a high-level hierarchical structure of objects representing information about the interface media or physical interfaces supported in each physical port, according to an embodiment of the present invention.

FIG. 3 is a pictorial representation of information that may be obtained and set with respect to the switch 100 in the preferred embodiment of the invention. The MIB pictorially is logically organized in a hierarchical tree structure as illustrated, where the hierarchy can be depicted as a tree with a root. This representation, however, does not necessarily illustrate the hierarchical structure of objects in an information database. The upper structure of a MIB tree is defined in the Request for Comments (RFC) 1155 and RFC 1213. Various other RFCs govern the other parts of the MIB structure.

In the preferred embodiment of the invention, another object is added to the interface table. The interface table is generally defined in RFC 2863 and RFC 1213. This port-related object is called "configured media type"-containing both primary interface media and failover mode. This media type object generally maps to the various interface media or physical interfaces 112, 114, 116 that exist in each port or port number. Each physical port is still preferably indexed using a unique ifIndex.

By adding the configured media type object, an NMS may obtain, e.g., get and set—define and configure—media-dependent parameters pertinent to the particular physical interface within a particular port/port number. FIGS. 1 and 3, viewed in conjunction, illustrate this point. For example, if the exemplary switch of the present invention has the primary media set to media 1 M1 112 and the NMS seeks to access information related to interface media 2 M2 114 in port 110, then the NMS preferably executes a 2-step process: (a) in the first step, the NMS sets the "primary media type" as media interface M2 114; and (b) in the second step, the NMS performs get/set operations using the ifIndex of port 110. In the second step, these get/set operations are done on interface media M2 114 of port 1 110. If the NMS skips the first step of changing "primary media type" to interface media M2 114, then all get/set operations are performed on the current primary interface media 112.

Network device 100, which is a forwarding device, is a managed node with its own MIB. This MIB contains information for each of the ports—port 1 110, port 2 120, and port N 130. It also contains media interface information 302, 304, 306, 308 and port information, such that the NMS, or at least the network administrator, understands that port 1 110, has three physical interfaces 112, 114, 116, as shown by the subtree 320, and that it has a configured primary media 332 and an operational media 334.

In the preferred embodiment of the invention, information related to each port is managed via the interface table and via SNMP, as discussed above. With this embodiment, a physical port is still identified by one unique interface index, i.e., preferably ifIndex, thus, allowing backward compatibility to existing network management applications. Moreover, management system applications, including web-based applications, may be readily developed using existing protocols and commands—including, but not limited to, SNMP, RMON, and hypertext transfer protocol (HTTP)-similar to how these applications currently work with single interface ports.

Another port-related object preferably present in the information database of the switch 100 is the operational media object 334. In the preferred embodiment of the invention, only one interface in each port 110, 120, 130 may be active at a given time. This active port is identified as the operational media 334.

The configured media object 332 contains or refers to the primary interface media 352 that the administrator has selected, or software defaulted, and identified as the primary interface media. In the preferred embodiment, the configured media object 332 also indicates the failover mode 350. There are preferably two failover modes—redundant and forced. A redundant mode indicates an automatic failover, while a forced mode indicates a manual failover. In an alternative embodiment, the failover mode information is stored in an object different from the primary interface media object.

The configured preferred media object 332 may contain a default primary interface media value, such as the first interface media in the port. This may be set by the device software 150 on boot-up of the device 100. Examples of configured preferred media object values include for example "forced media 1," "forced media 2," and "redundant media 1." The operational media 334 refers to the interface media 354 that is currently active and operational. Examples of operational media values include "media 1," "media 2" etc.

The interface media in both the configured media 352 and the operational media objects 354 need not necessarily be the same. It is possible, for example, for the selected or defaulted interface media to fail and be replaced by another redundant interface media. Thus, although the configured media 332 contains the media selected by the administrator, the operational media 334 contains the media or physical interface that is currently active and operational after failover. While the various subtrees under node/leaf port 2 120, port N 130, interface 2 114, and interface 3 116 have not been explicitly drawn, those of ordinary skill in the art will recognize that information related to each port and its respective physical interfaces may be configured and obtained similar to that discussed above.

Figure 4:
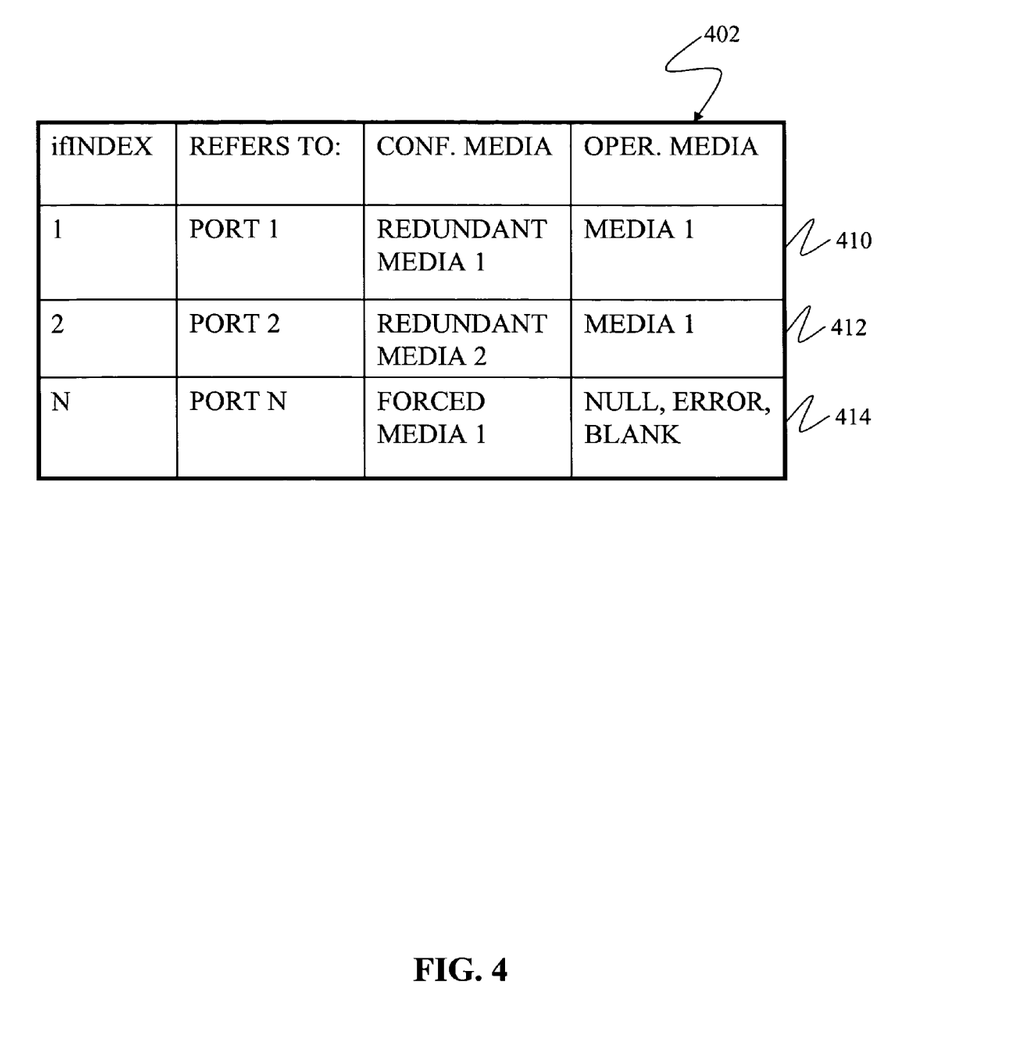
FIG. 4 is an exemplary table illustrating how ports are indexed or referenced in accordance with an embodiment of the invention.

FIG. 4 illustrates an exemplary table 402 showing the relationship of ifIndex and ports, as well as showing how the ifIndex is used to access the port's configured primary media object and operational media object. Each ifIndex value maps to a corresponding physical port. For example, in the first row 410, an ifIndex value of "1" refers to port 1 (110 of FIG. 1). In the next row 412, an ifIndex value of "2" refers to port 2 (120 of FIG. 1), while an ifIndex value of "N" refers to port N 414 (130 of FIG. 1). Thus, each port is uniquely identified with a corresponding ifIndex value, preferably starting from the number 1. Thus, if there are five ports, the corresponding ifIndex values are from one ("1") through five ("5")—"1" for port 1, "2" for port 2, "3" for port 3, and so on. The exemplary table 402, however, is not necessarily the graphical user interface display seen by administrators or users.

Figure 5:
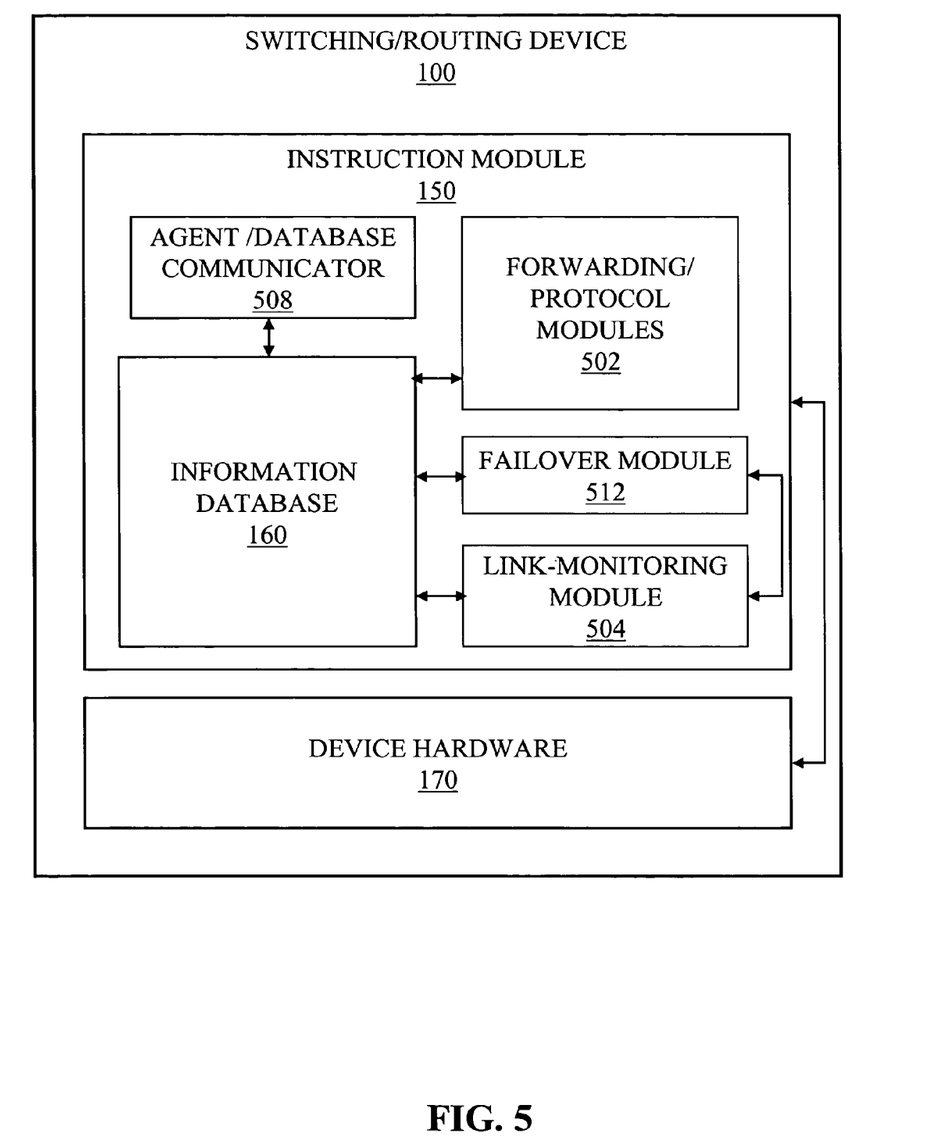
FIG. 5 is a functional block diagram similar to FIG. 1, but showing more instruction module details.

FIG. 5 is a high-level functional block diagram similar to FIG. 1 further detailing the exemplary instruction program module 150. In the preferred embodiment, the instruction module 150 includes three components. The first component is an agent or database communicator 508. This agent, in the preferred embodiment, is an SNMP agent consistent with that discussed in FIG. 2. This module 508 communicates with the information database 160 to obtain and set parameter information for each interface media and each port.

The link-monitoring module 504 is a component comprising program steps, that when executed, continually monitors the operational condition of each media interface in each port. This monitoring module 504 communicates with the failover module 512, particularly informing the failover module that a particular interface media is not in an acceptable operational condition, i.e., a failover condition—and that a failover process should be initiated.

The failover module 512 initiates and handles the manual or automatic failover mechanism of the forwarding device 100. The failover module 512 also communicates with the information database 160 to obtain and set media parameter information in the information database 160. Other instruction modules are also preferably included to carry out the other functions 502 of the forwarding device 100. These components may include program instruction components that when executed conduct protocol packet processing and fetch routing information.

Figure 6:
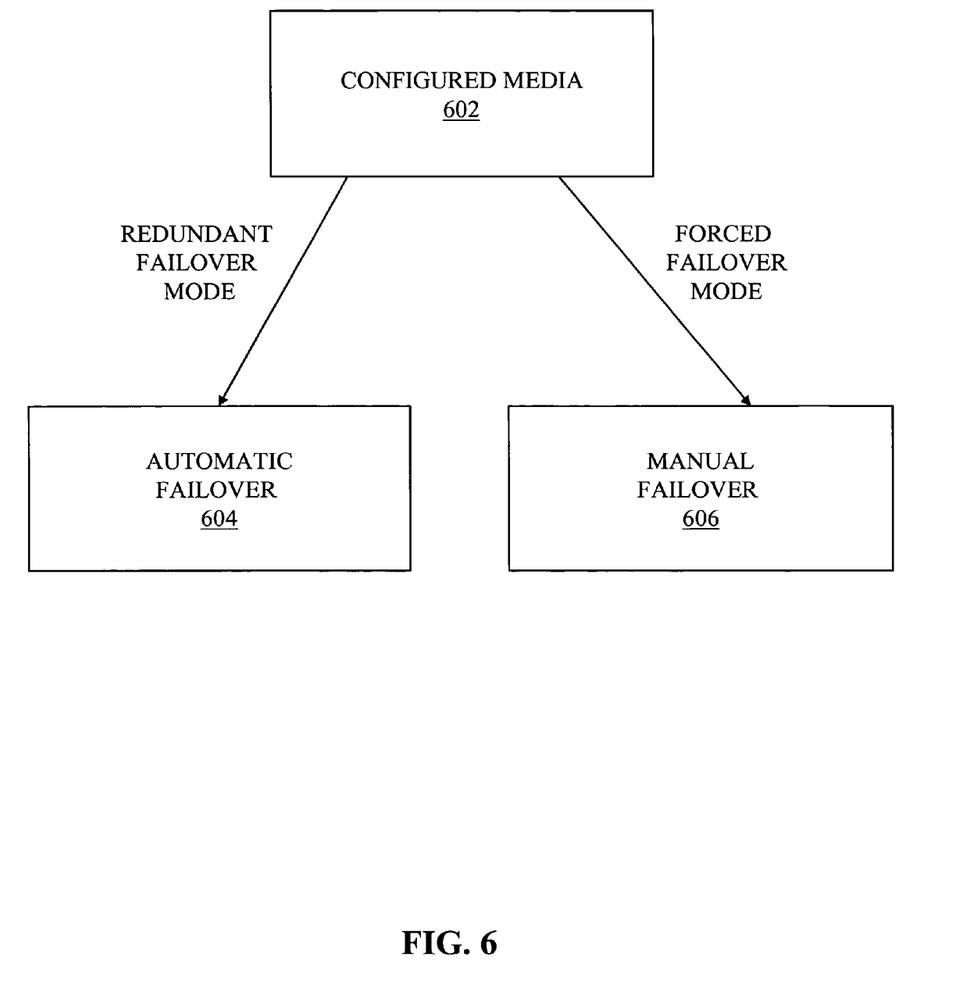
FIG. 6 is a high-level block showing the two preferred failover mechanisms according to an embodiment of the invention.

FIG. 6 is a high-level block diagram showing the two preferred general failover mechanisms of the present invention. After the primary configured media has been assigned, either by the administrator or by software default, a failure of such assigned configured media 602 initiates a failover mechanism 604, 606. Failure herein generally means that the link of the media interface is in an operational state/condition that satisfies a failover condition, e.g., exceeds a pre-determined failure threshold. A failure condition may be a condition that warrants another interface media to take over, such conditions include: link down; excessive traffic corruption; excessive line noise; and excessive cyclic redundancy checks failures. If the configured media type object 332 indicates a redundant failover mode, an automatic failover 604 is initiated. On the other hand, if the configured media type object 332 contains a forced failover mode, a manual failover 606 is initiated.

Figure 7:
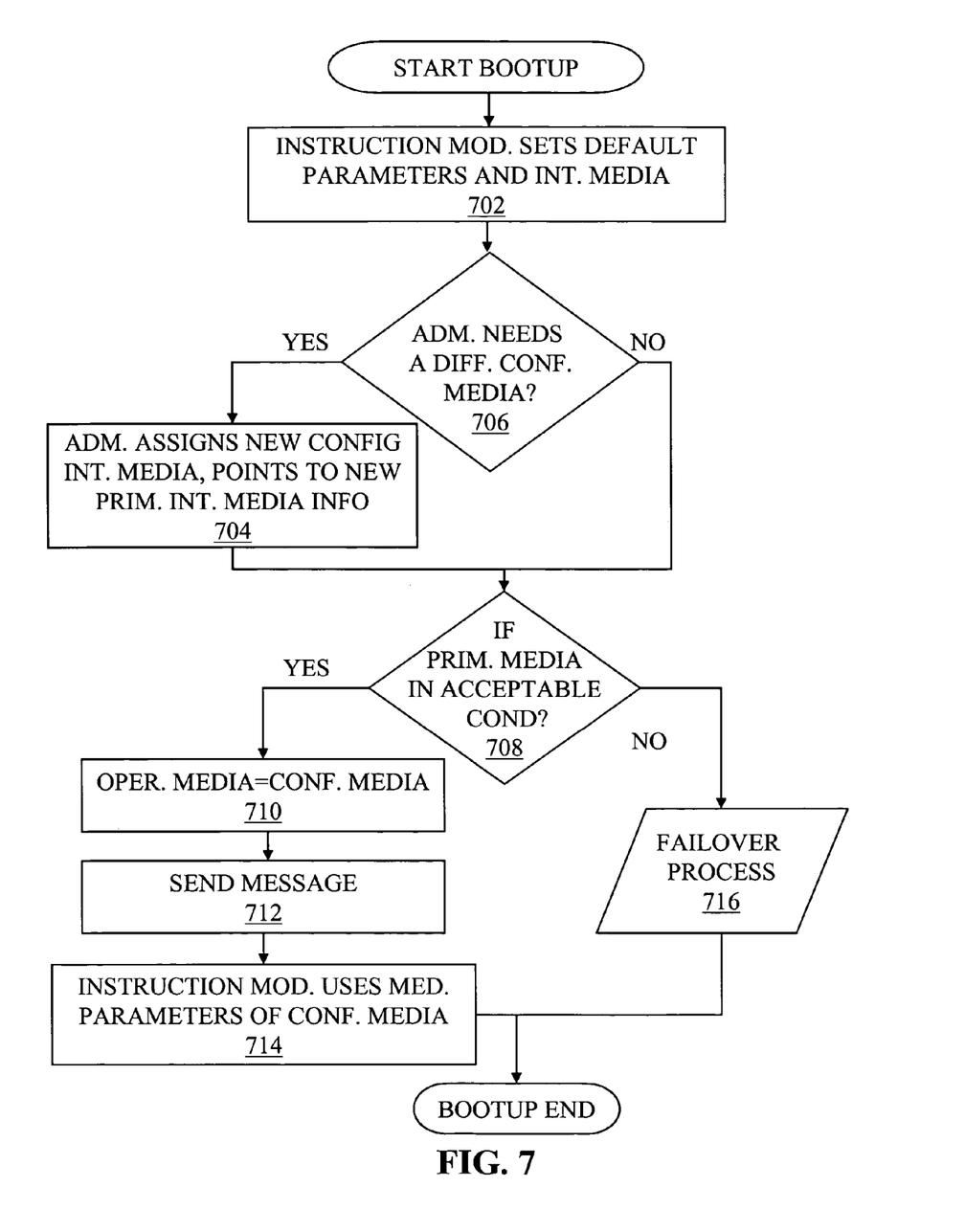
FIG. 7 is a high-level flowchart showing how configured interface media or physical interfaces are selected and how failover occurs, according to an embodiment of the invention.

FIG. 7 is a high-level flowchart illustrating an exemplary process by which failovers are handled. In general, to start, the forwarding device 100 is booted up. In this initialization operation, the device software 150 sets default media parameters and default primary interface media, including failover mode—in configured primary media object—for each port and corresponding interface media 702. This default information, for example, is loaded into switch memory. The default parameters are obtained from an information database, which is preferably incorporated as part of the program instructions or instruction module rather than contained in a separate and independent data source. These parameters, in one embodiment, are provided as part of the switch software provided by the device manufacturers. In this embodiment, default media parameters for each interface media within each port are contained in the program instructions.

If the administrator desires to change the configured media type object for each port, e.g., choose a different interface media type to be made primary (test 706), the administrator may do so by assigning 704 a new media type to the configured primary media type 332. With this action, the information base of old and new media interfaces are swapped, preferably within software, so that ifIndex can point to the new interface media type information. In the preferred embodiment, the administrator uses SNMP instructions or command to assign a particular interface media and failover mode, e.g., setting the configured media type object to redundant media 1-automatic failover and make media 1 to be the primary interface media.

If the assigned or defaulted configured primary media type is not operating in an acceptable operational condition (test 708)—meaning in a failover condition, the failover process (step 716) is invoked. The determination whether an interface media is in a failover condition is preferably done by the link-monitoring module 504.

If the configured media type, however, is in good operational condition—not in a failover condition, the operational media object is set to the same interface media contained in the configured media type (step 710). A message, preferably an SNMP trap, is then sent to the NMS (step 712), indicating that the assigned interface media is operational. The instruction module 150 then uses the media parameters of the configured or primary media type (step 714), for example, data are exchanged in the communications network based on the media parameters. This way, the forwarding device 100 and other applications, such as Ethernet drivers, SNMP reporting software applications, and other software applications, may work properly.

Figure 8A:
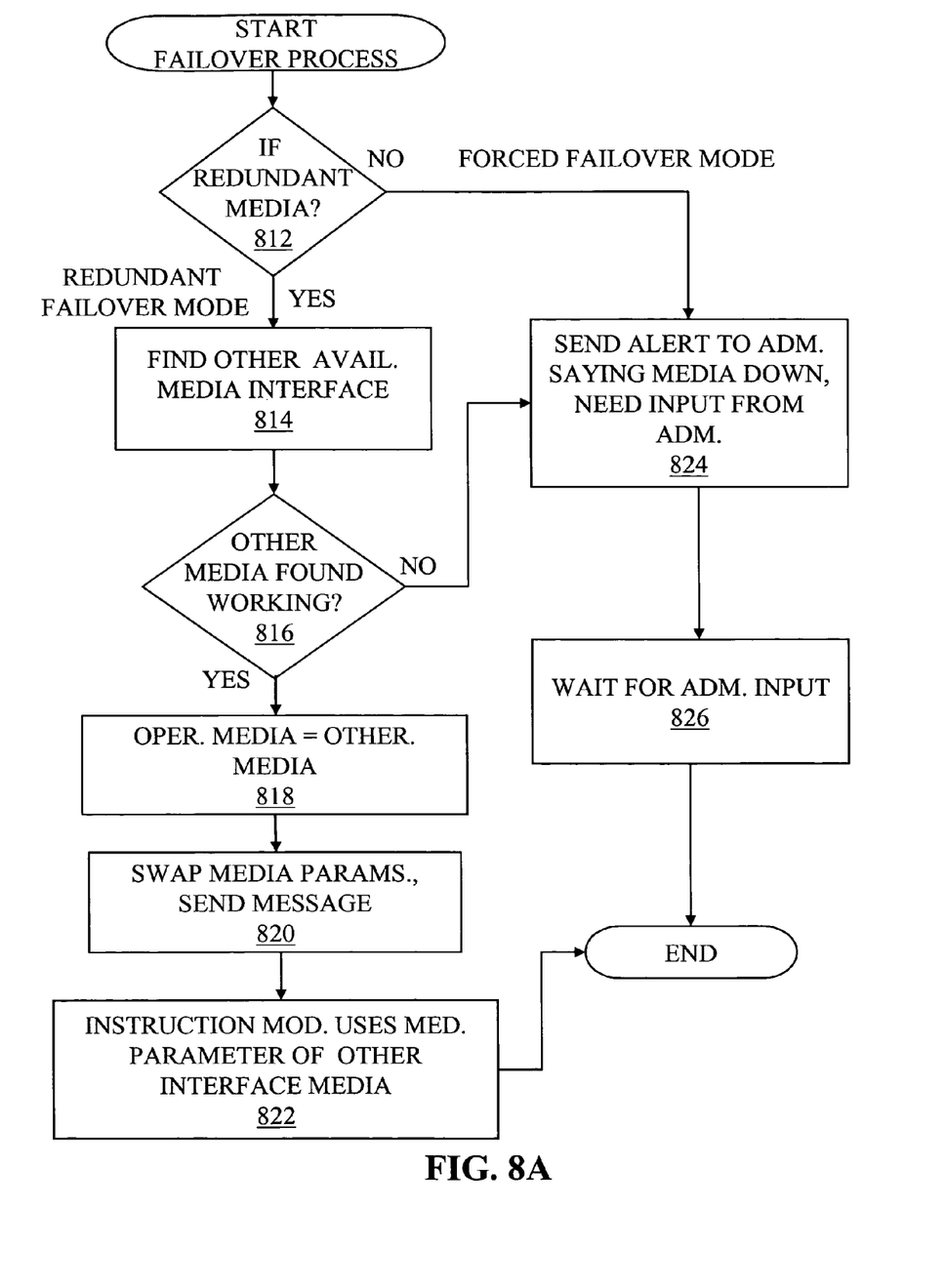
FIG. 8A is a flowchart showing the operations of a failover module.

FIG. 8A is a high-level flowchart of the failover process executed by the failover module 512. This process pertains to the situation wherein the operational interface media, which may different from or the same as the primary interface media, is in an unacceptable condition—i.e., in a failover condition. In the first operation, the configured media type object related to the port that had the failing interface media is read to determine failover mode and the primary interface media.

If the failover mode is redundant, the failover module 512, interfacing with the link-monitoring module 504, determines if other interface media or physical interfaces within that same port are available to be used and made operational (step 814). If one is available, the operational media object is set to the available interface media (step 818). This available interface media is then activated to replace the failing interface media. In one embodiment, if the primary interface media is one of the available interface media, it is preferably activated.

A message, preferably, a trap, is then sent to the NMS 820 indicating the now or current operational interface media and that the previously configured primary interface media has been replaced. The device software 150 then swaps media interface data structures and uses the media parameters of the current operational interface media (step 822). Data communication or exchanges in a network are thus based on these media parameters.

If the failover mode, however, is forced, the "no" branch from decision box 812, or if no alternate interface media is available to be activated, the "no" branch from decision box 816, an alert, preferably a trap, is sent to the NMS indicating that the previously operational interface media is now no longer operational (step 824). User intervention (step 826) is thus required to select a new primary interface media for the configured media type object.

Figure 8B:
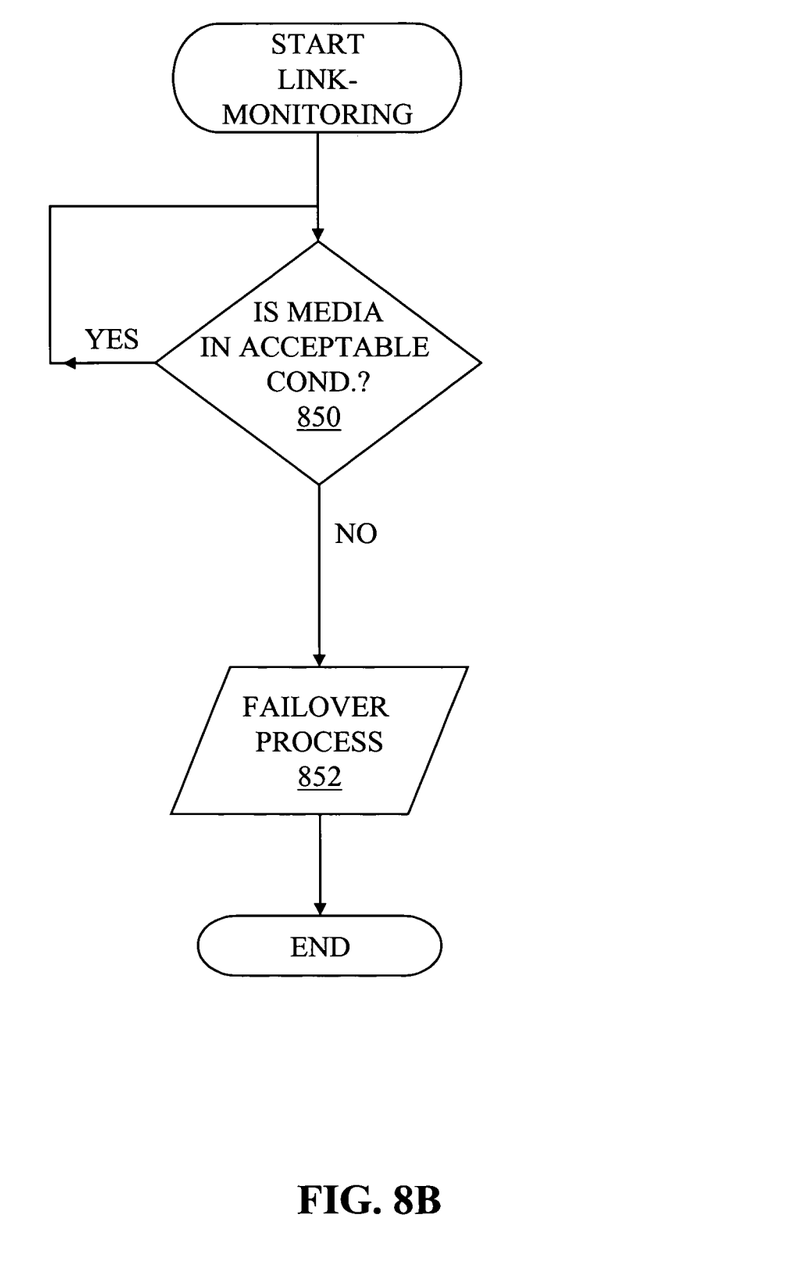
FIG. 8B is a flowchart showing the operations of a link-monitoring module.

FIG. 8B shows a high-level flowchart showing the link-monitoring process handled by the link-monitoring module 510. Generally, a check is made to determine whether the current interface media is in an acceptable operational condition (step 850)—i.e., not in a failover condition 850. If the interface media is in a failover condition, a failover process is initiated by sending a message to the failover module 852.

Figure 9A:
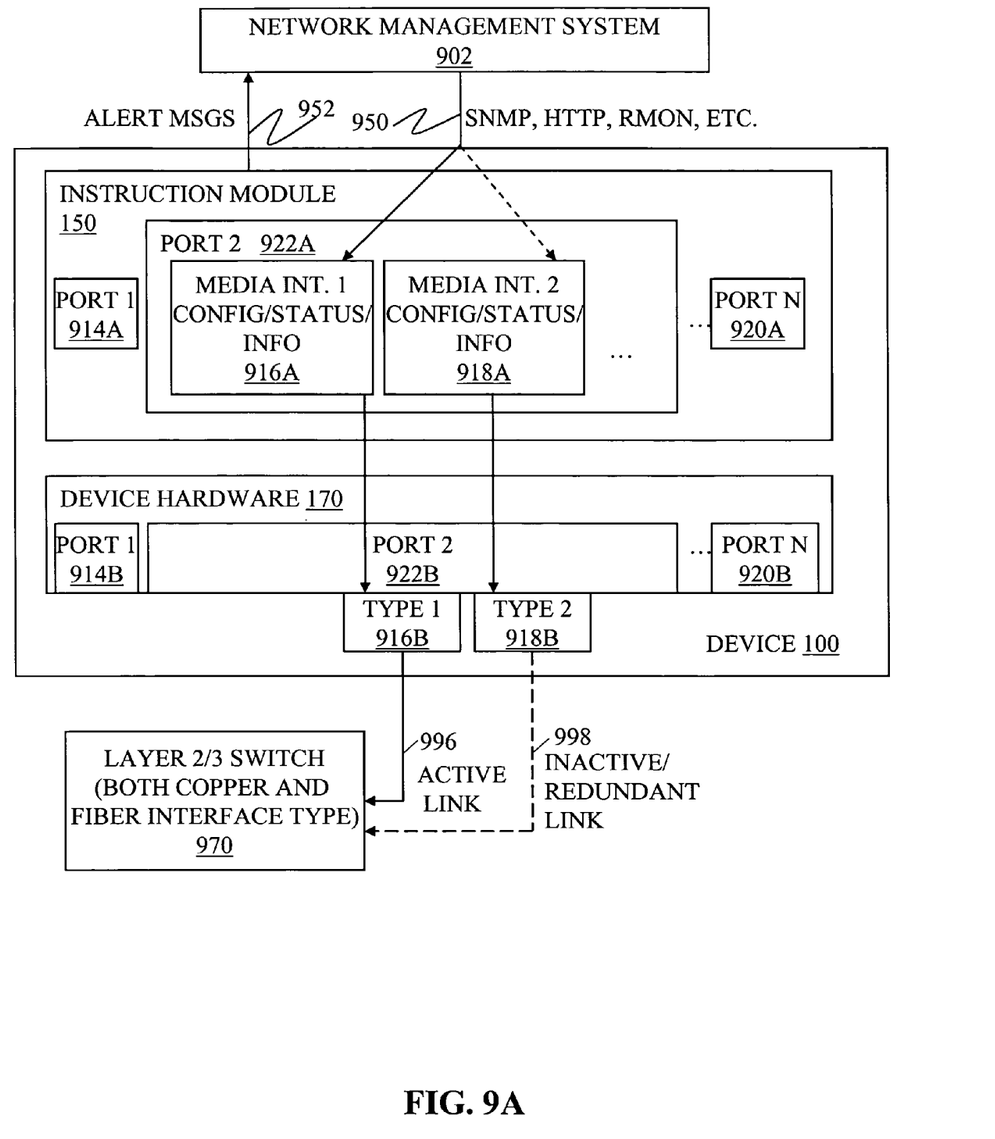
FIGS. 9A, 9B, and 9C are high-level schematic block diagrams of the various redundant network configurations that may be supported in accordance with an embodiment of the present invention.

FIG. 9A shows how the embodiment of the present invention supports media/port redundancy or sparing in a data communication network. In the preferred embodiment, only one interface in each port is active at a given time. The instruction module, e.g., the switch software, 150 manages each physical interface or interface media in each port by having separate media parameters for each interface, as discussed above. In this exemplary embodiment of the invention, a device hardware 170 has port 922B supporting two interface media 916B, 918B.

This switch hardware 170 is connected to a remote node, such as a multi-layer switch 970 supporting a plurality of media types including a first interface, e.g., an electrically conductive interface such as twisted pair herein referred to as a copper interface (not shown), and a second interface, e.g., an optically conductive interface herein referred to as a fiber interface (not shown). The copper and fiber interface may reside in the same physical port or in two different physical ports. The solid line 996 shows the active link, while the broken line 998 shows an inactive, backup, redundant link.

Since copper and optical fiber media types have different media parameters, including their physical properties, behavior, and configuration, if the copper link 996 goes down or is in an unacceptable operational condition, the switch may still work using the fiber media interface 998 by activating that interface. This redundant environment provides network reliability without the device 100 needing another connection in a spanning tree in accordance with the spanning tree protocol that prevents loops and redundant paths due to port or interface media redundancy. Each port is generally represented as one connection in a spanning tree; thus, additional media interfaces in the port do not require additional connections in the spanning tree. An existing spanning tree may be used without adding another connection. This absence of additional connection in a spanning tree is also due to only having one interface media, out of the multiple redundant media in same port, being operationally active at a time.

Figure 9B:
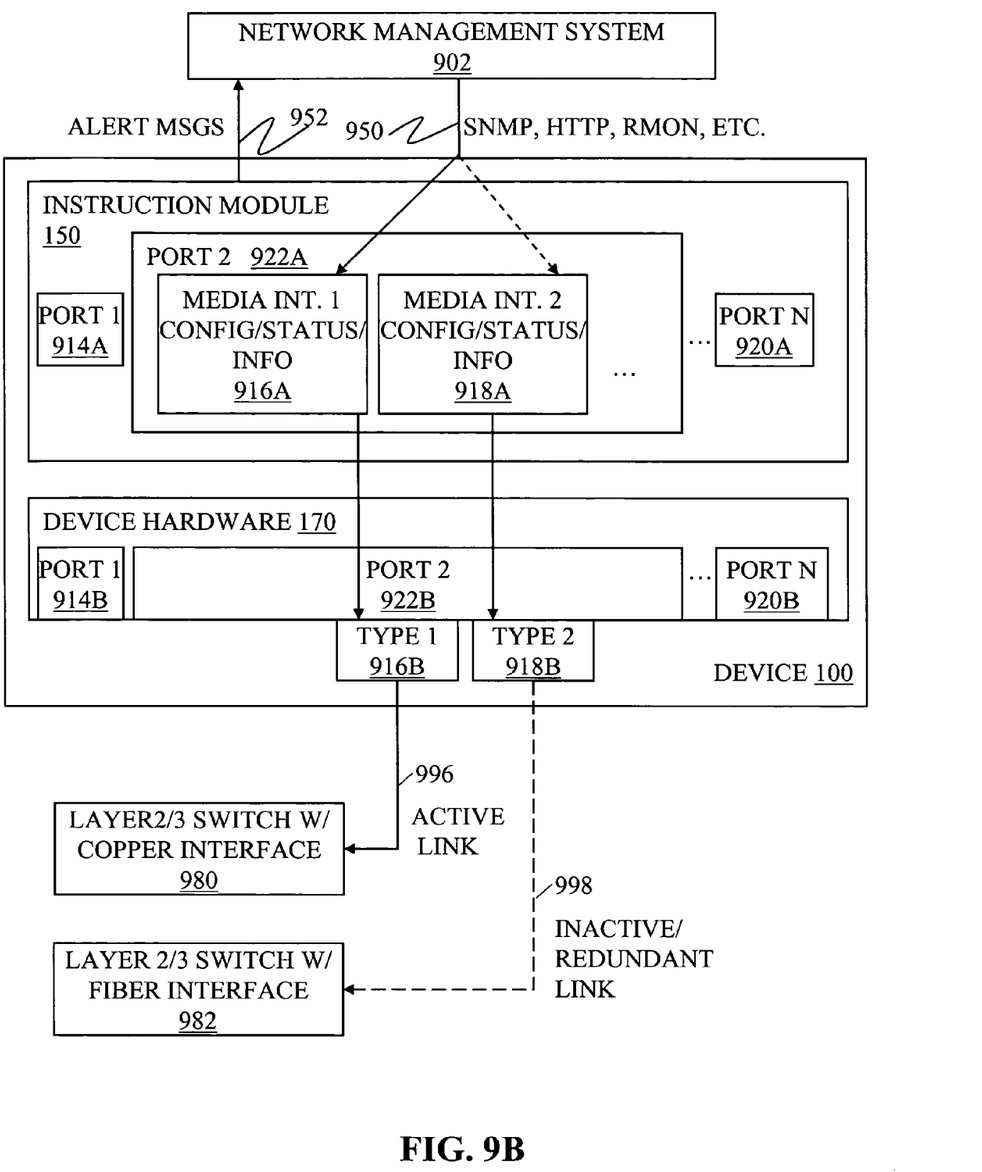

FIG. 9B is similar to FIG. 9A, but, in this data communication network, the device 170 is connected to two remote nodes—multi-layer switches. The switch hardware 170 is connected via a first interface, e.g., a copper interface 916B, to a first multi-layer switch 980 and via a second interface, e.g., a fiber interface 918B, to a second multi-layer switch 982. In this example, the number of ports within the switch hardware 170 may be reduced, considering that no separate redundant port is required—only another physical interface within the same port is used. Those of ordinary skill in the art will recognize that network reliability is also improved.

Figure 9C:
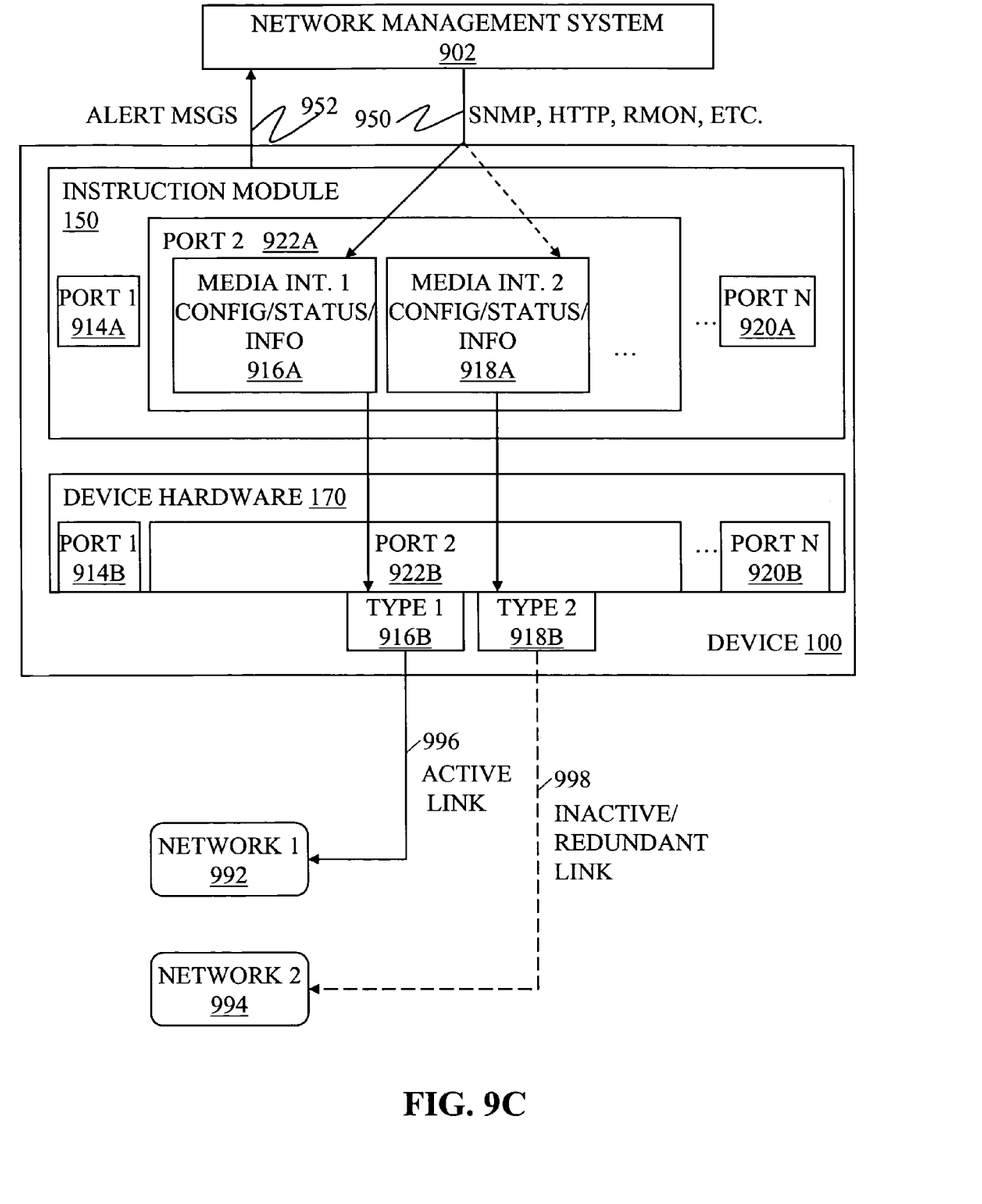

FIG. 9C is another data communication network embodiment of the invention, wherein the switch hardware 170 is connected to network 1 992 via interface 1 916B and inactively to another network 2 via interface 2 918B. This embodiment, for example, thus provides the device hardware 170 separate means to access different networks and no single point of failure and, thus, providing better network redundancy. A network may include local area networks, wide area networks, and provider networks such as AOL™ AND SBC™.

One of ordinary skill in the art will recognize that the various exemplified switch configurations, illustrate that the present invention, in its several embodiments, provides additional advantages not discussed above. For example, the number of management interface indexes in an SNMP environment can be reduced considering that both active and inactive interfaces may use the same index. Moreover, the same Internet Protocol address may be assigned to all the interface media in a particular port, enabling a simpler network management system. Another advantage is that existing management applications, e.g., SNMP and command line interface (CLI), may be used to control every interface media on the same port, without major changes in the MIB organization. Furthermore, the embodiments of the present invention also reduce the requirements of additional expensive equipment, such as additional Ethernet ports, for redundancy.

Ordinarily, the applications requiring change are lower layer applications and not upper layer applications. So, another advantage is that whenever a changeover or failover occurs from one interface to another, generally only applications dependent on the physical interface/media type need to change, others do not.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

Many alterations and modifications may be made by those having ordinary skill in the art without departing from the spirit and scope of the invention and its several embodiments disclosed herein. Therefore, it must be understood that the illustrated embodiments have been set forth only for the purposes of example and that it should not be taken as limiting the invention as defined by the following claims.

I claim:

1. A forwarding device comprising:
   one or more physical ports, each physical port comprising a plurality of interface media, wherein only one of the interface media in each of the ports is operational at a time;
   said each physical port is adapted for redundant configuration of different media interface wherein said forwarding device is connected to at least one remote forwarding apparatus; and
   an information database comprising media-dependent parameters for each of the interface media and port-related information for each of the ports, the port-related information comprising a primary interface media object and an operational interface media object, the primary interface media adapted to associate with each of the plurality of interface media within each of the ports, the operational media adopted to associate with the one of the plurality of interface media within each port that is active.

2. The device of claim 1 further comprising:
   an instruction module adapted to:
      exchange data in a data communication network based on the media-dependent parameters of the operational interface media object.

3. The device of claim 2 wherein an instruction module is further adapted to:
   update the media-dependent parameters of each of the plurality of interface media in each port.

4. The device of claim 2, wherein the instruction module is further adapted to:
   exchange data in the data communication network based on the media-dependent parameters of an assigned primary interface media object.

5. The device of claim 1, wherein the port-related information is further comprising a failover mode object indicating whether the failover mode is automatic or manual; and the forwarding device further comprising:
   an instruction module adapted to:
      monitor the operational interface media object of each of the ports for one or more failover conditions; and
      execute a failover process, based on the failover mode object, to replace the operational interface media object with a new operational interface media object within the same port when any of the one or more failover conditions exist.

6. The device of claim 5, wherein the primary interface media object and the failover mode object are both included in a configured primary interface media type object.

7. The device of claim 5, wherein the process includes searching the plurality of interface media within the same port for a new operational media type object.

8. The device of claim 5, wherein the failover process executes in accordance with a spanning tree based on a spanning tree protocol.

9. The device of claim 5, wherein one of the one or more failover conditions is excessive cyclic redundancy check failures.

10. The device of claim 5, wherein the instruction module is further adapted to:

exchange data in a data communication network based on the media-dependent parameters of the new operational interface media.

11. The device of claim 1, wherein the port-related information for each of the one or more ports is accessed from the information database by an interface index.

12. The device of claim 1, wherein the media parameters for each of the plurality of interface media in each of the one or more ports are accessed from the information database by an interface index and by the primary interface media type object.

13. The device of claim 1, wherein each of the interface media is selected from the group consisting of a wired interface media and a wireless interface media.

14. The device of claim 1, wherein the at least one remote apparatus further comprises a first network and a second network and the device is connected to the first network and the second network using at least two of the plurality of interface media supported in the same port, wherein a first interface media of the at least two interface media is connected to the first network and a second interface media of the at least two interface media is connected to the second network.

15. The device of claim 1, wherein the remote forwarding apparatus comprises a remote forwarding device connected to the forwarding device using at least two of the plurality of interface media in the same port.

16. The device of claim 1, wherein the device is connected to a first forwarding device and a second forwarding device using at least two of the plurality of interface media supported in the same port, wherein a first interface media of the at least two interface media is connected to the first forwarding device and a second interface media of the at least two interface media is connected to the second forwarding device.

17. A method of managing, in a communications network, a hybrid-forwarding device comprising one or more physical ports, each physical port comprising a plurality of interface media and wherein only one of the interface media within each of the ports is active at a time, the method comprising the steps of:

assigning a primary interface media object for each of the ports, the primary interface media object adapted to associate with each of the plurality of interface media within each of the ports wherein a forwarding device is connected to at least one remote forwarding apparatus; and assigning an operational interface media object for each of the ports, the operational media object dependent on one or more operational conditions, the operational media object adapted to associate with the one of the physical interface media within each of the physical ports that is active.

18. The method of claim 17, further comprising the step of:
accessing media parameters from an information database by using an interface index and the primary interface media object, the information database containing the media parameters for each of the interface media.

19. The method of claim 18, further comprising the step of:
exchanging data communication within the network based on the media parameters of the operational interface media object.

20. The method of claim 17 further comprising the step of:
assigning a failover mode for each of the ports, the failover mode object indicating whether the failover mode is automatic or manual;
monitoring the operational media object for one or more failover conditions;
executing a failover process, based on the failover mode, to replace the operational interface media object with a new operational interface media object within the same port when one of the one or more failover conditions exists; and
exchanging data communication within the network based on the media parameters of the new operational interface media object.

\* \* \* \* \*